US006398355B1

(12) United States Patent
Shirota et al.

(10) Patent No.: US 6,398,355 B1
(45) Date of Patent: Jun. 4, 2002

(54) INK, INK SET, INK CARTRIDGE, RECORDING UNIT, IMAGE RECORDING METHOD AND IMAGE RECORDING APPARATUS

(75) Inventors: Koromo Shirota, Kawasaki; Shoji Koike, Yokohama; Yutaka Kurabayashi, Murayama; Shinichi Hakamada; Masashi Ogasawara, both of Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/259,253

(22) Filed: Mar. 1, 1999

(30) Foreign Application Priority Data

Mar. 3, 1998 (JP) .......................... 10-050511

(51) Int. Cl.[7] .............................................. G01D 11/00
(52) U.S. Cl. ......................... 347/100; 347/101; 347/96
(58) Field of Search ................... 347/100, 101, 347/95, 106, 96; 106/31.58

(56) References Cited

U.S. PATENT DOCUMENTS

| 5,540,764 | A | * | 7/1996 | Haruta et al. ............... 347/100 |
| 5,549,740 | A | | 8/1996 | Takahashi et al. ......... 106/20 R |
| 5,734,403 | A | * | 3/1998 | Suga et al. ................. 347/101 |
| 5,764,261 | A | | 6/1998 | Koike et al. ................ 347/100 |
| 5,782,967 | A | * | 7/1998 | Shirota et al. ........... 106/31.58 |
| 5,902,387 | A | * | 5/1999 | Suzuki et al. ............... 347/100 |
| 5,928,388 | A | * | 7/1999 | Leaver ........................... 8/638 |
| 5,952,414 | A | * | 9/1999 | Noguchi et al. ............ 524/377 |
| 5,997,124 | A | * | 12/1999 | Capps et al. .................. 347/14 |
| 5,997,623 | A | * | 12/1999 | Lin .......................... 106/31.58 |

FOREIGN PATENT DOCUMENTS

| EP | 0 617 161 A1 | | 9/1994 | |
| EP | 0 779 344 A1 | | 6/1997 | |
| JP | 54-59936 | | 5/1979 | |
| JP | 3-160070 | | 7/1991 | |
| JP | 8-80664 | | 3/1996 | |
| JP | 9-151345 | | 6/1997 | |
| JP | 10095107 | * | 4/1998 | .............. B41J/2/01 |

* cited by examiner

Primary Examiner—John Barlow
Assistant Examiner—Manish S Shah
(74) Attorney, Agent, or Firm—Fitzpatrick, Cella, Harper & Scinto

(57) ABSTRACT

The purpose is to provide such ink hardly as to affect an exothermic heater on a change in ink jet performance when used for a long-time ink jet recording according to the way to eject an ink by using an exothermic heater. The ink contains at least one substance selected from dicarboxylic acids, dicarboxylates, tricarboxylic acids and tricarboxylates, bis-hydroxyethyl sulfone, and a water-soluble coloring material in an aqueous medium.

45 Claims, 4 Drawing Sheets

INK, INK SET, INK CARTRIDGE, RECORDING UNIT, IMAGE RECORDING METHOD AND IMAGE RECORDING APPARATUS

BACKGROUND OF THE INVENTION

1. Field of the Invention

The present invention relates to an ink, in particular, an ink used appropriately for an ink jet recording for recording on a recording medium by ejecting ink from an orifice in response to an ink recording signal, an ink set using the same, an ink cartridge, a recording unit, an image recorder and an image recording method.

2. Related Background Art

With respect to the ink jet recording technique, various ways have been thus far proposed, such as e.g., way to continuously generate changed ink droplets and use part of them for recording, way to give a signal to a recording head having a piezoelectric element and eject an ink in response to the signal or way to give thermal energy corresponding to a recording signal to the in-chamber ink of a recording head, e.g., by using an exothermic heater and eject an ink with the aid of the energy for recording. An ink jet recording method of way to eject an ink by using a foam phenomenon of ink due to thermal energy, for example, as described in Japanese Patent Application Laid-Open No. 54-59936 is a principal way in the current ink jet recording method from the viewpoint of easiness in highly integrating and highly concentrating of: the openings (hereinafter, referred to as "orifices") for ejecting an ink.

On the other hand, also as regards an ink for use in these ink jet recording techniques, various compositions, e.g., for obtaining images of better quality have been reported and proposed. Especially in recent years, for better recording on plain paper such as copy paper, report paper, note-book paper or letter paper, used generally in offices, and further cloth, an intensive research and development has been made from multifarious aspects such as ink composition and ink property.

Meanwhile, one of the characteristics which the ink preferably has as an ink for use in an ink-jet recording technique in which heat energy is applied to an ink by using an exothermic heater in response to a recording signal to eject the ink from an orifice, is that the ink causes no or litter foreign matters deposition, so called koge, on the exothermic heater during the recording process. With regard to an ink-jet recording process in which heat is applied to an ink to eject the ink from an orifice, foreign matters, koge, are tend to be deposited gradually on the surface of an exothermic heater, and the koge results in decrease of heat conductivity form the heater to the ink. The decrease in heat conductivity may cause some problems. For example, enough bubbles for ejecting the ink are not formed and certain amount of the ink necessary for proper recording is not ejected, or an ink ejection is completely stopped. That is, ink ejecting stability is disrupted.

For such a technological problem, an improvement in kogation by the content of oxo anions in ink has formerly been attempted, for example, in Japanese Patent Application Laid-Open No. 3-160070. Besides, Japanese Patent Application Laid-Open No. 9-151345 discloses a technique of inhibiting the occurrence of a scorch by the content of phytinic acid and its salts in ink. Furthermore, Japanese Patent Application Laid-Open No. 8-80664 discloses a technique of preventing kogation onto an exothermic head and promoting the jet durability by joint use of a liquid composition containing a cationic substance and bis-hydroxyethyl sulfone (BHES).

SUMMARY OF THE INVENTION

As a result of detailed examination on the problem of kogation in water-color ink, especially containing a water-soluble coloring material as color material, the inventors noticed a substantial improvement in scorching by addition of BHES but obtained acknowledge that there were cases where kogation different from formally occurred is deposited on an exothermic heater for a long-lasting time of recording. And from the subsequent study, they found that the relevant scorch contained sulfur, carbon and inorganic metals such as calcium and iron as well. In spite of there being cases where sulfur atoms exist as sulfonate group also in a water-soluble coloring material, hardly occurrence of kogation containing sulfur atoms was observed on an exothermic heater when not using BHES and therefore the inventors conjectured that this kogation is derived from BHES. The degree of the kogation is slight as compared with that caused by an ink which does not contain BHES ccurring on an exothermic heater in. However when the recording head of an ink jet recording apparatus is constructed so as to reduce an amount of ink ejected by one ejection action in order to meet the demand for a much better image, the amount of energy given to ink by an exothermic heater is decreased. In such a critical condition, even a minute kogation may fluctuate the amount of the ink ejected from the orifice, and the fluctuation would affect the recording of a highly defined image. Therefore, it was concluded that break through in the aforementioned problem was required in order to obtain a much higher quality image stably.

On the basis of further examination, the inventors found that the kogation can be very effectively inhibited even over a long period of recording by addition of at least one substance selected from dicarboxylic acids, dicarboxylates, tricarboxylic acids and tricarboxylates in water-color ink containing a water-soluble coloring material and BHES, thus leading to the present invention.

An object of the present invention is to provide an ink hardly affecting the exothermic heater on a change in ink jet performance in a long-time use for ink jet recording according to the way to eject an ink by using an exothermic heater.

Another object of the present invention is to provide an image recording method capable of stably recording an image excellent in quality even over a long time of recording.

A further object of the present invention is to provide an image recording apparatus capable of stably recording an image excellent in quality even over a long time of recording and an ink cartridge, an ink set and a recording unit usable therewith.

Still another object of the present invention is to provide such an ink that a long time of use for ink jet recording according to the way to eject an ink by using an exothermic heater hardly affects the heater to change in ink jet performance and that no ejecting of ink from orifices after a pause of recording hardly occurs even under various using environments or for further finer orifices.

Still further object of the present invention is to provide an image recording method capable of stably recording an image excellent in quality even over a long time of recording and capable of stably forming a high quality image even under multifarious using environments and capable of stably exhibiting the effectiveness even for finer orifices to attain a further higher quality of recording images.

Still another further object of the present invention is to provide an image recording apparatus capable of stably recording an image excellent in quality even over a long time of recording and capable of stably forming a high quality image even under multifarious using environments and capable of stably exhibiting the effectiveness even for finer orifices to attain a further higher quality of recording images and further an ink cartridge, an ink set and a recording unit usable therewith.

An ink according to one embodiment of the present invention attainable to the above object is characterized by containing at least one substance selected from the group consisting of dicarboxylic acids, dicarboxylates, tricarboxylic acids and tricarboxylates, bis-hydroxyethyl sulfone and a water-soluble coloring material in an aqueous medium.

An ink according to another embodiment of the present invention attainable to the above object is characterized by containing at least one substance selected from the group consisting of dicarboxylic acids, dicarboxylates, tricarboxylic acids and tricarboxylates, bis-hydroxyethyl sulfone and a coloring material wherein the total amount of dicarboxylic acids, dicarboxylates, tricarboxylic acids and tricarboxylates, is not greater than 0.7% by weight relative to the whole weight of ink.

An ink cartridge according to one embodiment of the present invention attainable to the above object is characterized by comprising an ink housing section for housing ink containing at least one substance selected from the group consisting of dicarboxylic acids, dicarboxylates, tricarboxylic acids and tricarboxylates, bis-hydroxyethyl sulfone and a water-soluble coloring material in an aqueous medium.

An ink cartridge according to another embodiment of the present invention attainable to the above object is characterized by comprising an ink housing section for housing ink containing at least one substance selected from the group consisting of dicarboxylic acids, dicarboxylates, tricarboxylic acids and tricarboxylates, bis-hydroxyethyl sulfone and a water-soluble coloring material wherein the total amount of dicarboxylic acids, dicarboxylates, tricarboxylic acids and tricarboxylates is not greater than 0.7% by weight relative to the whole weight of ink.

A recording unit according to one embodiment of the present invention attainable to the above object is characterized by comprising an ink housing section for housing ink containing at least one substance selected from the group consisting of dicarboxylic acids, dicarboxylates, tricarboxylic acids and tricarboxylates, bis-hydroxyethyl sulfone and a water-soluble coloring material in an aqueous medium, means for giving the recording ink to a recording medium and means for supplying the ink to the above means.

A recording unit according to another embodiment of the present invention attainable to the above object is characterized by comprising an ink housing section for housing ink containing at least one substance selected from the group consisting of dicarboxylic acids, dicarboxylates, tricarboxylic acids and tricarboxylates, bis-hydroxyethyl sulfone and a coloring material wherein the total amount of dicarboxylic acids, dicarboxylates, tricarboxylic acids and tricarboxylates is not greater than 0.7% by weight relative to the whole weight of an ink; means for giving the recording ink to a recording medium; and means for supplying the ink to the above means.

An ink set according to another embodiment of the present invention attainable to the above object is characterized by comprising a combination of an ink containing at least one substance selected from the group consisting of dicarboxylic acids, dicarboxylates, tricarboxylic acids and tricarboxylates, bis-hydroxyethyl sulfone and a first water-soluble coloring material in an aqueous medium and ink containing a second coloring material wherein each of the first and the second coloring materials is one selected from coloring materials such as; yellow, magenta, cyan, black, red, blue and green.

An image recording method according to one embodiment of the present invention attainable to the above object is characterized by comprising a process for giving an ink containing at least one substance selected from the group consisting of dicarboxylic acids, dicarboxylates, tricarboxylic acids and tricarboxylates, bis-hydroxyethyl sulfone and a water-soluble coloring material in an aqueous medium to the image forming region of a to-be-recorded medium.

An image recording method according to another embodiment of the present invention attainable to the above object is characterized by comprising a process for giving an ink containing at least one substance selected from the group consisting of dicarboxylic acids, dicarboxylates, tricarboxylic acids and tricarboxylates, bis-hydroxyethyl sulfone and a coloring material wherein the total amount of dicarboxylic acids, dicarboxylates, tricarboxylic acids and tricarboxylates is not greater than 0.7% by weight relative to the whole weight of ink to an image forming region in a to-be-recorded medium.

An image recorder according to one embodiment of the present invention attainable to the above object is characterized by comprising an ink housing section for housing ink containing at least one substance selected from the group consisting of dicarboxylic acids, dicarboxylates, tricarboxylic acids and tricarboxylates, bis-hydroxyethyl sulfone and a water-soluble coloring material in an aqueous medium, means for giving the recording ink to a to-be-recorded medium and a recording unit comprising means for supplying the ink to the above means; and means for actuating the recording unit in response to a recording signal.

An image recording apparatus according to another embodiment of the present invention attainable to the above object is characterized by comprising an ink housing section for housing ink containing at least one substance selected from the group consisting of dicarboxylic acids, dicarboxylates, tricarboxylic acids and tricarboxylates, bis-hydroxyethyl sulfone and a coloring material wherein the total amount of dicarboxylic acids, dicarboxylates, tricarboxylic acids and tricarboxylates is not greater than 0.7% by weight relative to the whole weight of ink; means for giving the recording ink to a to-be-recorded medium; and a recording unit comprising means for supplying the ink to the above means.

And, according to the individual embodiments mentioned above, images excellent in quality can be stably recorded over a long time with little change in ink jet performance even for a long duration of ink jet.

An image recording method according to one embodiment of the present invention attainable to the above object is characterized by comprising a process for allowing ink containing at least one substance selected from the group consisting of dicarboxylic acids, dicarboxylates, tricarboxylic acids and tricarboxylates, bis-hydroxyethyl sulfone, urea and a water-soluble coloring material in an aqueous medium to the image forming region of a to-be-recorded medium wherein the total amount of dicarboxylic acids, dicarboxylates, tricarboxylic acids and tricarboxylates, is not greater than 0.7% by weight relative to the whole weight of ink, to stick-to the image recording region of a recording medium by using a recording head so arranged as enable to eject 0.1 to 40 pl of ink from orifices by one time of jet operation.

An image recording apparatus according to one embodiment of the present invention attainable to the above object is characterized by comprising: an ink housing section for housing ink containing at least one substance selected from the group consisting of dicarboxylic acids, dicarboxylates, tricarboxylic acids and tricarboxylates, bis-hydroxyethyl sulfone, urea and a water-soluble coloring material in an aqueous medium wherein the total amount of dicarboxylic acids, dicarboxylates, tricarboxylic acids and tricarboxylates is not greater than 0.7% by weight relative to the whole weight of ink; a recording head equipped with means for ejecting the ink from orifices to a recording medium and means for supplying the ink to the recording head wherein said recording head is so arranged as able to eject 0.1 to 40 pl of ink from orifices by one time of jet operation; and means for actuating the recording unit in response to a recording signal.

A recording unit according to one embodiment of the present invention attainable to the above object is characterized by comprising: an ink housing section for housing ink containing at least one substance selected from the group consisting of dicarboxylic acids, dicarboxylates, tricarboxylic acids and tricarboxylates, bis-hydroxyethyl sulfone, urea and a water-soluble coloring material in an aqueous medium wherein the total amount of dicarboxylic acids, dicarboxylates, tricarboxylic acids and tricarboxylates is not greater than 0.7% by weight relative to the whole weight of ink; a recording head equipped with means for ejecting the ink from orifices to a recording medium; and means for supplying the ink to the recording head wherein said recording head is so arranged as enable to eject 0.1 to 40 pl of ink from orifices by one time of jet operation.

Besides, according to the individual embodiment mentioned above, images excellent in quality can be stably recorded over a long time with little change in ink jet performance even for a long duration of ink jet and further hardly any occurrence of clogging in orifices after a pause of recording even under various using environments or for further finer orifices.

(Operation)

With regard to the respective embodiments of the present invention, when allowing at least one substance selected from the group consisting of dicarboxylic acids, dicarboxylates, tricarboxylic acids and tricarboxylates to be contained in an aqueous ink containing water-soluble coloring material and BHES with individual embodiments of the present invention, it is considered, though the reason for an increase in the ink-jet stability of ink is obscure, that the property of koge formed on an exothermic heater changes by addition of these substances and the kogation is extremely minimized on account of its weak adhesion to the heater even if koge is deposited onto the heater.

DETAILED DESCRIPTION OF THE PREFERRED EMBODIMENTS

Figure 1:
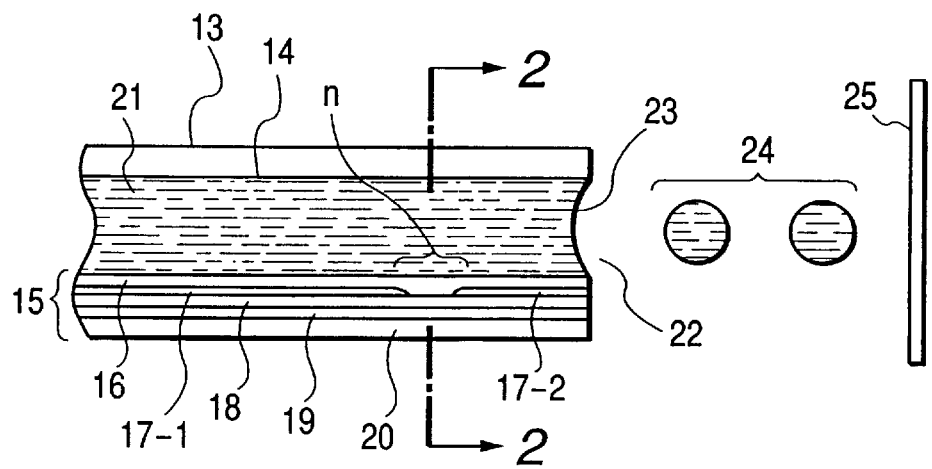
FIG. 1 is a longitudinal sectional view showing one embodiment of head in an ink jet recorder.

Hereinafter, referring to preferred embodiments, the present invention will be described in further details.

(First Embodiment)

An ink according to a first embodiment of the present invention contains at least one substance selected from the group consisting of dicarboxylic acid, dicarboxylates, tricarboxylic acid and tricarbolates, BHES and water-soluble coloring material(s) in a water-soluble color medium.

(BHES/its quantity)

BHES has the structure represented by the following structural formula (I) and commercially available one synthesized by a formerly well-known method can be used.

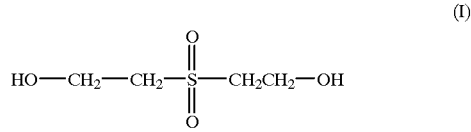

(I)

The content of BHES in the ink ranges preferably from 0.1 to 30% by weight, in particular from 1 to 20% by weight, for example, relative to the whole weight of the ink. In such a range, a kogation onto an exothermic heater, e.g., a location derived from coloring materials in ink can be more effectively inhibited.

(Dicarboxylic Acids, Dicarboxylates, Tricarboxylic Acids and Tricarboxylates)

Specific examples of :dicarboxylic acid, dicarboxylates, tricarboxylic acids and tricarboxylates will be described hereinafter. Specifically, as examples of dicarboxylic acids, succinic acid, maleic acid and phthalic acid can be referred. Besides, as examples of tricarboxylic acid, citric acid can be referred. Furthermore, as examples of dicarboxylates and tricarboxylates, metal salts, e.g., sodium salts can be referred. And especially, when at least either of citric acid and sodium citrate is contained ink containing BHES and water-soluble coloring material(s), the occurrence of a kogation onto an exothermic heater is intensively inhibited and an extremely appropriate use for a further promotion of jet stability is possible without breaking down of a wire in the exothermic heater under ordinary recording conditions.

The content of such substances in ink is preferably in the range between 0.0001 and 0.7% by weight, in particular between 0.002 and 0.5% by weight relative to the whole weight of ink. In this range, a better jet stability can be obtained.

(Coloring materials/Content thereof)

Coloring materials are not particularly limited only if water-soluble, but water-soluble dyes that have been publicly known since former times, e.g., water-soluble anionic dyes, direct dyes, acidic dyes and reactive dyes can be used. In consideration of the density of a recording image and the jet characteristic of ink, the content of the above dyes in ink is preferably in the range between 0.5 and 15% by weight, in particular between 1 and 12% by weight relative to the whole weight of ink.

(With respect to aqueous media)

The aqueous medium serves to hold a substance selected from dicarboxylic acid, dicarboxylates, tricarboxylic acids and tricarboxylates as mentioned above, BHES and a water-soluble coloring material in solution as making up ink. And preferably it contains at least water as component of the aqueous medium and a water-soluble organic solvent may be mixed to increase the solubility of individual ink constituents or to adjust various characteristics of ink. The ratio of water in the whole weight of ink ranges, for example, from 20 to 95% by weight, preferably from 40 to 95% by weight and more preferably from 60 to 95% by weight.

(Specific examples of water-soluble dyes)

Meanwhile, examples of water-soluble dyes containing anionic groups available for coloring materials of ink according to this embodiment are as follows.

(Black Ink)

As dyes used for Black ink, for example, C.I. Direct Black 17, C.I. Direct Black 19, C.I. Direct Black 22, C.I. Direct Black 31, C.I. Direct Black 32, C.I. Direct Black 51, C.I. Direct Black 62, C.I. Direct Black 71, C.I. Direct Black 74, C.I. Direct Black 112, C.I. Direct Black 113, C.I. Direct Black 154, C.I. Direct Black 168, C.I. Acid Black 2, C.I. Acid Black 48, C.I. Acid Black 110, C.I. Reactive Black 1, C.I. Reactive Black 8, C.I. Reactive black 12, C.I. Reactive Black 13, C.I. Hood Black 1, C.I. Hood Black 2, etc. are referred.

(Yellow Ink)

As dyes used for yellow ink, for example, C.I. Acid Yellow 11, C.I. Acid Yellow 17, C.I. Acid Yellow 23, C.I. Acid Yellow 25, C.I. Acid Yellow 29, C.I. Acid Yellow 42, C.I. Acid Yellow 49, C.I. Acid Yellow 61, C.I. Acid Yellow 71, C.I. Direct Yellow 12, C.I. Direct Yellow 24, C.I. Direct Yellow 26, C.I. Direct Yellow 44, C.I. Direct Yellow 86, C.I. Direct Yellow 87, C.I. Direct Yellow 98, C.I. Direct Yellow 100, C.I. Direct Yellow 130, C.I. Direct Yellow 142, etc. are referred.

(Magenta Ink)

As dyes used for magenta ink, for example, C.I. Acid Red 1, C.I. Acid Red 6, C.I. Acid Red 8, C.I. Acid Red 32, C.I. Acid Red 35, C.I. Acid Red 37, C.I. Acid Red 51, C.I. Acid Red 52, C.I. Acid Red 80, C.I. Acid Red 85, C.I. Acid Red 87, C.I. Acid Red 92, C.I. Acid Red 94, C.I. Acid Red 115, C.I. Acid Red 254, C.I. Acid Red 289, C.I. Direct Red 1, C.I. Dirct Red 4, C.I. Direct Red 13, C.I. Direct Red 17, C.I. Direct Red 23, C.I. Direct Red 28, C.I. Direct Red 31, C.I. Direct Red 62, C.I. Direct Red 79, C.I. Direct Red 81, C.I. Direct Red 83, C.I. Direct Red 89, C.I. Direct Red 227, C.I. Direct Red 240, C.I. Direct Red 242, C.I. Direct Red 243, etc. are referred.

(Cyan Ink)

As dyes used for cyan ink, for example, C.I. Acid Blue 9, C.I. Acid Blue 22, C.I. Acid Blue 40, C.I. Acid Blue 59, C.I. Acid Blue 93, C.I. Acid Blue 102, C.I.

Acid Blue 104, C.I. Acid Blue 113, C.I. Acid Blue 117. C.I. Acid Blue 120, C.I. Direct Blue 6, C.I. Direct Blue 22, C.I. Direct Blue 25, C.I. Direct Blue 71, C.I. Direct Blue 78, C.I. Direct Blue 86, C.I. Direct Blue 106, C.I. Direct Blue 199, etc. are referred.

Besides, as dyes contained in ink according to the present invention, dyes having one or more —COOM groups (M: alkali metal, ammonium or organic ammonium) are used appropriately. Specifically, dyes as expressed, e.g., in the general formulae (II) to (V) are effectively used in the present invention.

(II)

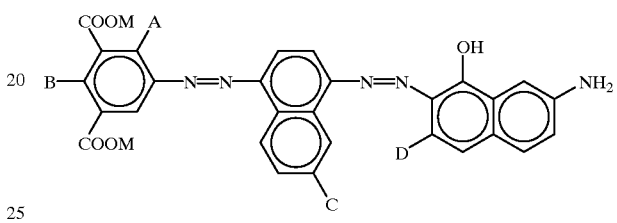

[in the formula, A and B: hydroxyl group or hydrogen atom; C: hydrogen atom or $SO_3M$; and D: $SO_3M$]

(III)

$$\left[ CuPc \begin{matrix} (SO_3H)_{1.4} \\ SO_2NH-C_2H_4-N \end{matrix} \begin{matrix} CH_2CH_2OH \\ N \\ N \\ Z \end{matrix} NH-G \right]_{2-}$$

[in the formula, G: any of those expressed in the structural formulae (1) to (4) mentioned below; and Z: $NHCH_2CH_2OH$, $N(CH_2CH_2OH)_2$ or the like]

(1)

[benzene ring with COOM]

(2)

[benzene ring with COOM and COOM]

(3)

[benzene ring with R or OR' and COOM]

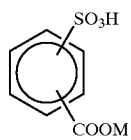

(4)

[in the structural formula (3) mentioned above, R and R': H or lower alkyl group]

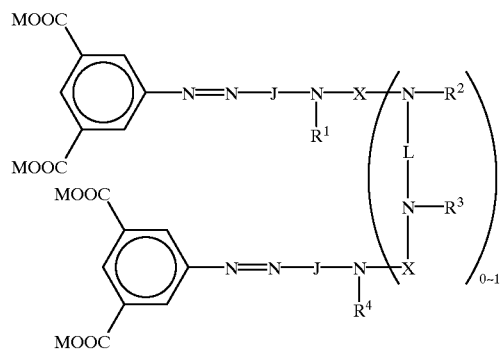

(IV)

[in the formula, J: any of those expressed in the structural formulae (5) to (7) mentioned below:

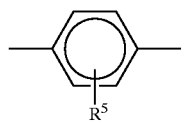

(5)

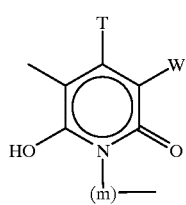

(6)

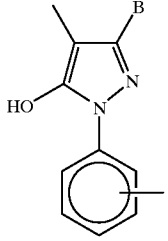

(7)

L: the structural formula (8) or (9) mentioned below;

—CH$_2$CH$_2$— (8)

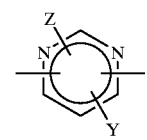

(9)

X: any of the structural formulae (10) to (12);

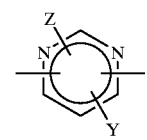

(10)

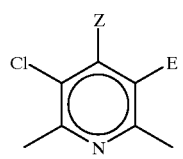

(11)

(12)

and R$^1$—R$^4$: —H, lower alkyl group or the like][in the structural formulae (5) to (12) mentioned above, B: —H or —COOH; W: —H, —CN, amide group, pyridinium group or —COOH; m: integer of 2 to 8; Z: alkoxy group, —OH, alkyl amino group, —NH$_2$ or the like; Y: —H, —Cl or —CN; E: —Cl or —CN; and R$^5$: —H, lower alkyl group or the like]

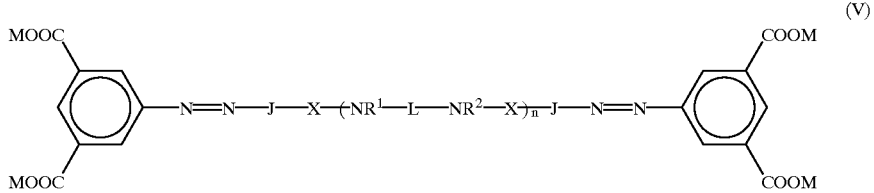

(V)

[in the formula, J: the structural formula (13) mentioned below;

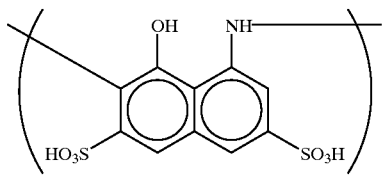 (13)

L: the structural formula (14) or (15) mentioned below;

 (14)

—CH$_2$CH$_2$—

 (15)

X: any of those expressed in the structural formulae (16) to (18); and R$^1$ and R$^2$: —H, lower alkyl group or the like]

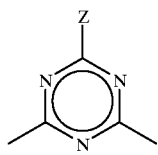 (16)

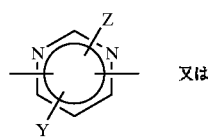 又は (17)

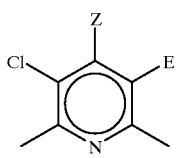 (18)

[in the structural formulae (16) to (18), Z: alkoxy group, —OH, alkyl amino group, —NH$_2$ or the like; Y: —H, —Cl or —CN; and E: —Cl or —CN]

(Relation between the above coloring materials and ink pH)

When the above coloring materials, in particular water-soluble coloring materials containing —COOM in a molecule, are contained in ink, pH of ink is adjusted preferably to on the order of 9.5 to 12, in particular to that of 9.5 to 11. Namely, by setting the pH of ink to this range, the solubility of an aqueous medium for coloring materials is improved remarkably, thus enabling a change in characteristics during the preservation of ink to be inhibited. Besides, by setting the pH of ink to:within this range, the kogation of an exothermic heater is extremely inhibited. The inventors of the present invention have been aware of the fact that the kogation of an exothermic heater is inhibited to extremely effective extent if the pH of ink containing a water-soluble coloring material and BHES: is set within this range. This is because a intense effect of inhibiting the kogation onto the exothermic heater is attained by a synergistic effect of the addition of at least one compound of dicarboxylic acid, dicarboxylate, tricarboxylic acid and tricarboxylate to ink and the adjusted pH of ink. Furthermore, if the pH is so adjusted as to lie within the above range, dissociation of carboxylic acid proceeds in ink, so that a sufficient effect can be obtained even for a somewhat smaller content of dicarboxylic acids, dicarboxylates, tricarboxylic acids and tricaboxylates in ink within the above range.

(Metal-Containing Dyes)

Besides, the application of an ink jet recording technique to the dyeing of a cloth has been proposed in recent years. And, as a :result of hereinbefore study, the inventors have been aware of the fact that metal-containing dyes with chromium, cobalt or the like in a molecule can be appropriately used as a coloring material contained in ink used for the dyeing of a cloth in consideration of adhesion to a cloth or a strong color fastness of light required for a cloth. Besides, as a further examination of these coloring materials, the inventors have also been aware of the fact that intra-molecular metal ions are liberated in ink so as to easily form a scorch on an exothermal heater and accordingly a very delicate preparation of ink is necessary to ensure a stable jet performance of ink by using such ink. With such an invention according to this embodiment, however, the occurrence of a scorch onto an exothermic heater can be effectively inhibited even for ink employing such a coloring material, thus enabling the jet stability to be promoted. Besides, as coloring materials used in ink for ink jet recording, greatly widening the applicable range of coloring materials limited in use becomes possible.

Herein, as the specific examples of the metal-containing dyes available. for coloring materials of ink according to this embodiment, the following coloring materials can be referred:

CI Acid Yellow 59, 121, 151, 158, 194, 204, 207, 232, 235 and 241;

CI Acid Orange 142, 144, 166 and 168; CI Acid Red 215, 296, 315, 357, 359, 362 and 399;

CI Acid Violet 90 (see the structural formula (VI) mentioned below), 92 (see the structural formula (VII) mentioned below) and 121;

C.I. Acid Violet 90 (Reddish violet) A 2:1 chromium complex of

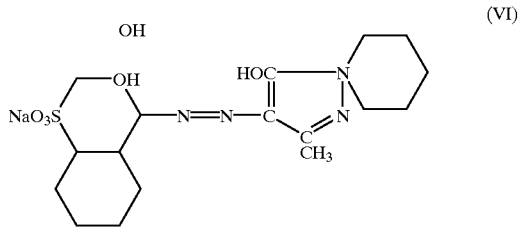 (VI)

C.I. Acid Violet 92 (Bluish violet) A 2:1 cobalt complex of

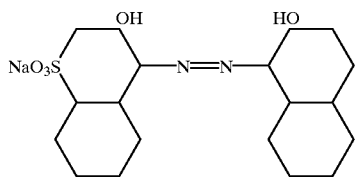

(VII)

CI Acid Red 167, 193 (see the structural formula mentioned below), 229, 284, 296, 300, 335, 338 and 342;

C.I. Acid Blue 193 (Reddish navy) A 2:1 chromium complex of

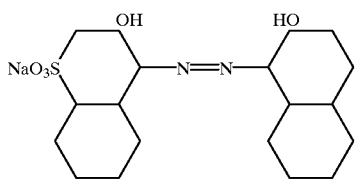

(VIII)

CI Acid Brown 19, 282, 283, 289, 298, 355, 357, 365, 413 and 415;

CI Acid Black 52, 52:1 (see the structural formula IX mentioned below), 60, 99, 107, 155, 188, 194 and 222;

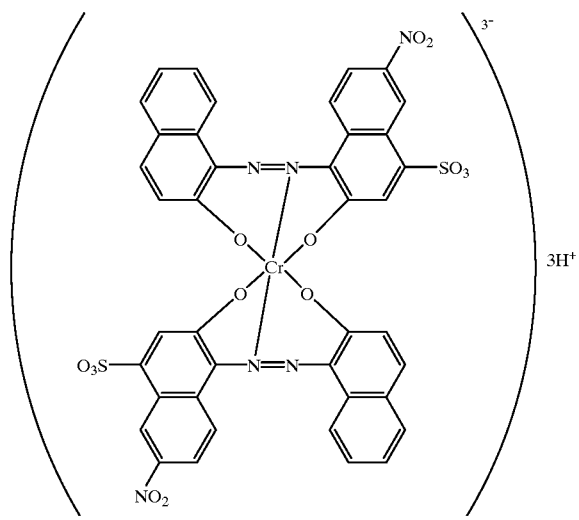

(IX)

C.I. Acid Black 52:1
CI Acid Green 73, 104 and 108.

(With respect for metal-contained dyes and ink pH)

When metal-contained dyes as mentioned above are used as coloring materials in ink according to this embodiment, it is preferable to adjust the pH of ink to 3.5 to 7.5, in particular 3.5 to 6.5. Namely, by setting the pH of ink to within this range, the ion dissociation of dyes in ink can be inhibited, thus enabling the kogation onto an exothermic heater to be minimized. Besides, as another example of coloring material available for ink according to the present invention, even dyes whose use is limited for the ink jet recording using thermal energy on account of a poor heat resistance of the dye structure itself and an easy occurrence of a scorch or the like, can be used. As specific examples of such coloring materials, C.I. Acid Yellow 79 can be referred.

(Specific examples of water-soluble organic solvent)

As examples of water-soluble organic solvents that may be contained in an aqueous medium for ink according to this embodiment, monohydric alcohols such as methanol, ethanol and isopropyl alcohol; ketone or keto-alcohols such as acetone and diaceton alcohol;

ethers such as tetrahydrofuran and dioxane; addition polymers of oxyethylene or oxy-propylene such as diethylene glycol, triethylene glycol, tetraethylene glycol, dipropylene glycol, tripropylene glycol, polyethylene glycol and polypropylene glycol; alkylene glycols with 2–6 carbon atoms contained in the alkylene group such as ethylene glycol, propylene glycol, trimethylene glycol, butylene glycol and hexylene glycol; triols such as 1,2,6-hexane triol; thiodiglycol; glycerine; lower alkylethers of polyhydric alcohols such as ethylene glycol monomethyl- (or ethyl-) ether, diethylene glycol monomethyl- (or ethyl-) ether and triethylene glycol monomethyl- (or ethyl-) ether; lower dialkylethers of polyhydric alcohols such as triethylene glycol dimethyl- (or ethyl-) ether and tetraethylene glycol dimethyl- (or ethyl-) ether; etc. are referred. The content of the above water-soluble organic solvents is generally in the range of 0 to 40% by weight, preferably 2 to 30% by weight, relative to the whole weight of ink. In the case of joint use of media as mentioned above, they can be used alone or as mixture, but preferable water-soluble organic solvents are monohydric alcohols, ketone, glycerine, ethylene glycol, diethylene glycol, triethylene glycol, tetraethylene glycol, thiodiglycol, propylene glycol, dipropylene glycol, tripropylene glycol and derivatives thereof (above all, their alkylethers).

(Other constituents)

Besides, the ink according to this embodiment may be added various antifoaming agents, viscosity adjusters, surface tension adjuster, pH adjuster or the like within such an extent as not to injure the effect developed by ink if necessary.

(Second Embodiment/Addition of Urea)

As an ink according to a second embodiment of the present invention, an ink with urea further added to the ink according to the first embodiment is referred. With an ink according to the second embodiment, a more improved reejectability can be afforded to the effects displayed by ink according to the first embodiment than former. Here, the reejectability property means the operation of ejecting the ink from orifices after the pause of recording. From the heretobefore examination, the inventors have found in some sorts of aqueous ink containing a water-soluble coloring material that ink to be fed to orifices is solidified during the pause of recording and perfectly or partly clogs the orifices, thus disabling ink to be ejected again or a predetermined amount of ink to be ejected in a correct direction and have been aware of the fact that this tendency is often observed especially for finer orifices accompanying a highly refined record image or in use of an ink jet recording apparatus under diversified using conditions with spreading ink jet recording apparatus, in particular under low temperature environments. By further content of urea in ink according to this embodiment, however, the effect of stabilizing the reejectability even under conditions as mentioned above is also obtained in addition to the effects displayed by ink according to the first embodiment. Although the reason why the above described effect can be obtained by adopting such an arrangement is unclear, BHES in the ink is solid at normal temperature, and in the case that BHES content in water exceeds 80% by weight, BHES tends to generate in the form of wax. This phenomenon is microscopically considered to begin as water evaporates from the orifice also in the ink facing to the orifices. On the other hand, since urea substantially raises the affinity of water with an aqueous dye, the coexistence of BHES and urea is considered to bring about a synergism of the effect of suppressing the evaporation of water in ink from orifices and the effect of preventing a drastic rise in the dye concentration of ink near orifices, resulting from the deposition of BHES for ink to be fed to orifices. In this aspect, the amount of urea is set preferably to 0.1 to 20% by weight, in particular to 0.1 to 15% by weight relative to the whole weight of ink and the sum of urea and BHES vs the whole weight of ink is set preferably to 0.2 to 30% by weight, in particular to 0.6 to 25% by weight.

(Device)

Next, an ink jet recorder capable of using the ink mentioned above and an image recording method using them will be described.

(Head configuration)

Figure 2:
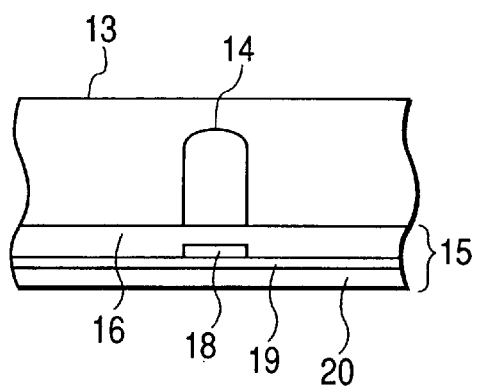
FIG. 2 is a sectional view taken on line 2—2 of FIG. 1.

FIG. 1 is a schematic sectional view of one embodiment of head constituting one of the principal part of an ink jet recording apparatus in the way to eject an ink by using thermal energy, taken in a direction of longitudinally crossing the orifice portion for the eject of ink. Besides, FIG. 2 is a sectional view taken in line 2—2 of FIG. 1. In FIGS. 1 and 2, the head 13 is obtained by sticking a glass, ceramics or plastic plate, etc. having a groove 14 for passing of ink to an exothermic head 15 used for thermosensible recording (the head is shown in FIGS. 1 and 2, but is not limited to this). The exothermic head 15 comprises a protective film 16 formed of silicon oxide or the like, aluminum electrodes 17-1 and 17-2, an exothermic resistor layer 18 formed of nichrome or the like, a heat accumulating layer 19 and a substrate 20 of alumina or the like, which is good in heat radiation. Ink 21 reaches to jet orifices (fine holes) 22 and forms a meniscus 23 by a predetermined pressure P. And, on applying of an electric signal to the electrode 17-1 and 17-2, the region indicated with "n" of the exothermic head 15 heats up radically, foam is generated in the ink 21 in contact therewith, the meniscus 23 projects by its pressure, ink 21 is ejected from orifices 22, flies toward a to-be-recorded medium (e.g., paper etc.) 25 and adheres to the image recording region of the to-be-recorded medium 25 and an image is recorded.

Figure 3:
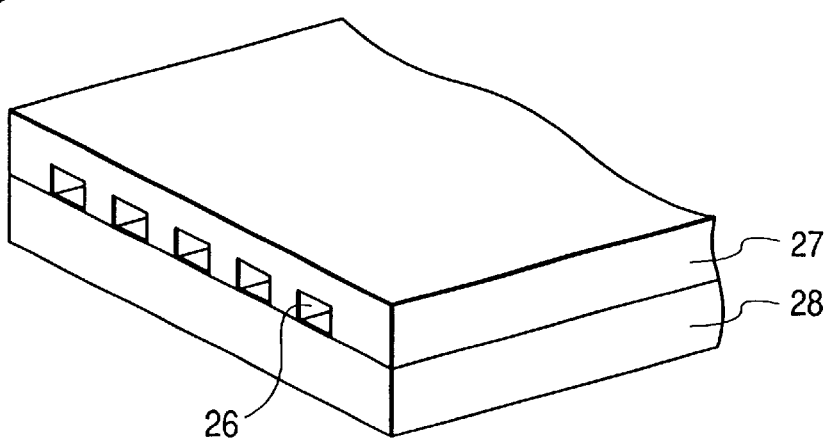
FIG. 3 is a schematic illustration of a multi-head.

FIG. 3 is a outer appearance view of a multi-head with many heads in FIG. 1 lined up. The multi-head is fabricated by bringing a glass plate 27 having a multi-groove 26 into close contact with an exothermic head 28 similar to the one illustrated in FIG. 1.

In the arrangement mentioned above of a head, the size of an orifice is not particularly defined and may be suitably set corresponding to a desired image quality. With a recent request for a higher image quality, however, it is considered to make the size of an orifice finer. Specifically, making an orifice so as to set the amount of ink ejected from an orifice by one-time jet operation to 0.1 to 40 pl, in particular 0.1 to 30 pl, for example, is examined and in an orifice of such a size, a stable re-jet of ink after a pause of recording becomes one especially preferable technical target in forming a high quality image. And, ink according to various embodiments of the present invention, in particular according to the second embodiment can be referred as one extremely effective technique capable of overcoming this technical target.

Besides, even if an orifice is not made finer as mentioned above, no eject of ink due to the clogging of orifices may take place in use of an ink jet recording apparatus under using environments diversified with spreading ink jet recording apparatus, specifically e.g., at ambient temperatures of 5° C. or lower (e.g., indoors or outdoors as cold as any heating system is of no avail in cold northern districts) and this point is also referred to as one important technical target to be overcome from the viewpoint of a further spread of ink jet recording apparatus. And, ink according to the individual embodiments mentioned above, in particular according to the second embodiment is referred to as one extremely effective technique capable of overcoming this technical target.

(Ink Jet Recording Apparatus)

Figure 4:
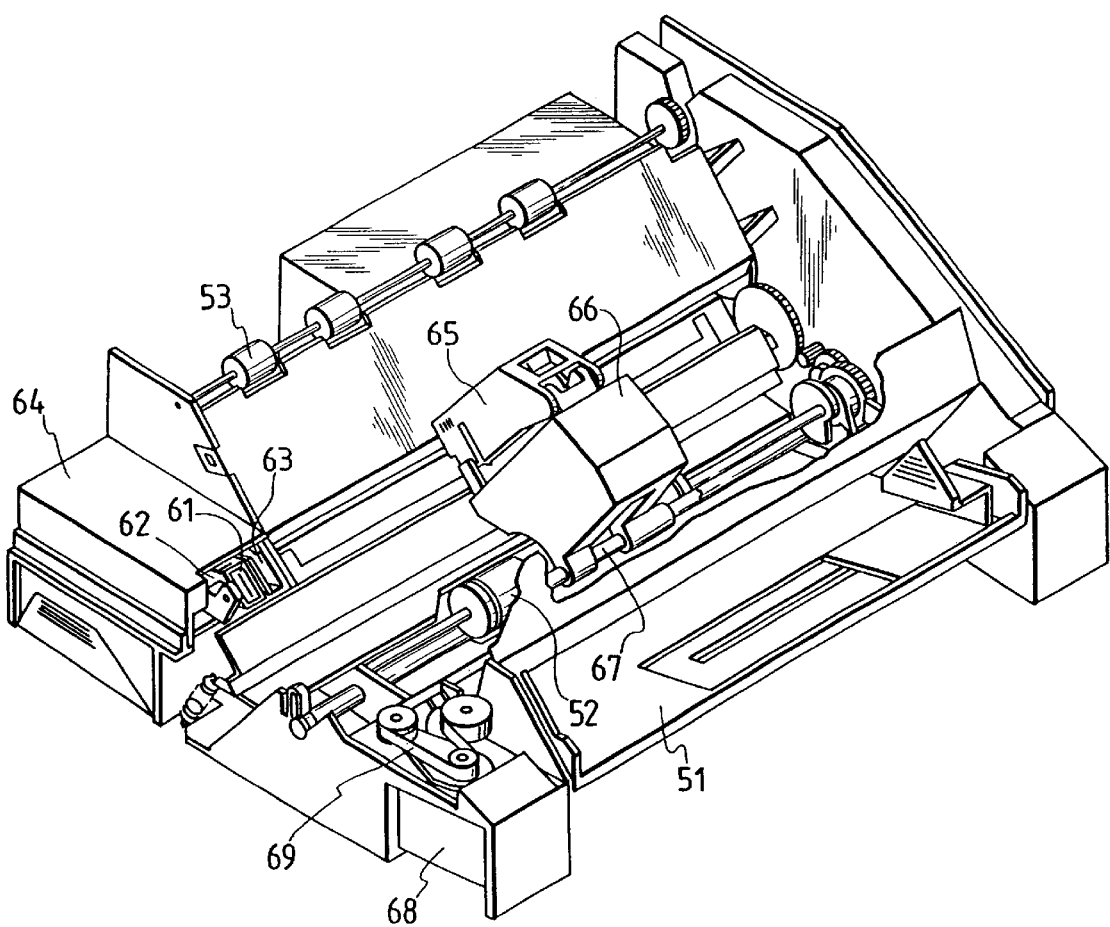
FIG. 4 is a schematic perspective view showing one embodiment of an ink jet recorder.

In FIG. 4, one example of an ink jet recording apparatus with such a head incorporated is shown. In FIG. 4, numeral 61 denotes a blade as wiping member, whose one end is retained by a retainer member to become a fixed end and assumes a shape of canti lever. The blade 61 is disposed at a position adjacent to the recording region by a recording head and is retained in the form of projecting into the moving path of a recording head in this example. A cap denoted by 62 is disposed at the home position adjacent to the blade 61 and is so arranged as to move perpendicularly to the moving direction of a recording head, butts against the jet outlet surface and serves for capping. Furthermore, 63 denotes an absorber which is provided adjacently to the blade 61 and is retained in the form of projecting into the moving path of a recording head as with the blade 61. A jet restoration section 64 is composed of the blade 61, cap 62 and absorber 63 mentioned above and a removal of moisture, dust or the like on the surface of ink jet outlet is made by means of the blade 61 and the absorber 63. A recording head 65 has jet energy generating means and executes the recording by jetting of ink to a recording medium opposite to the jet outlet surface with a jet outlet disposed for recording and a carriage 66 for mounting a recording head 65 to move the recording head 65, which is slidably engaged with a guide shaft 67 and partly connected to the belt 69 (not shown) to be driven by a motor 68. Thereby, the carriage 66 becomes movable along the guide shaft 67, thus enabling the recording region and its adjacent region to be moved by means of the recording head 65. With the arrangement of a paper feed section 51 for inserting sheets of record paper and a paper feed roller 52 driven by an unshown motor, a sheet of record paper is fed to a position opposite to the jet outlet face and discharged to the paper discharge section with a paper discharge roller 53 disposed with an advance of recording.

With the arrangement mentioned above, during the return of a recording head 65 to the home position after the completion of recording or the like, the cap 62 of a head restoration section 64 escapes from the moving path of the recording head 65, but the blade 61 projects into the moving path. As a result, the jet outlet face of the recording head 65 is wiped. Incidentally, in the capping of a cap 62 by butting against the jet face of the recording head 65, the cap 62 moves so as to project. into the moving path.

In the case when the recording head 65 moves from the home position to the recording start position, the cap 62 and the blade 61 are positioned at the same position as the one mentioned above during the wiping. As a result, the jet outlet face of the recording head 65 is wiped also in this move. The above move of the recording head to the home position proceeds not only for the completion of recording and for the restoration of recording but for recording also, in which the recording head moves to the home position adjacent to the recording region by a predetermined interval and the above wiping is carried out together with the move.

(Ink Cartridge)

Figure 5:
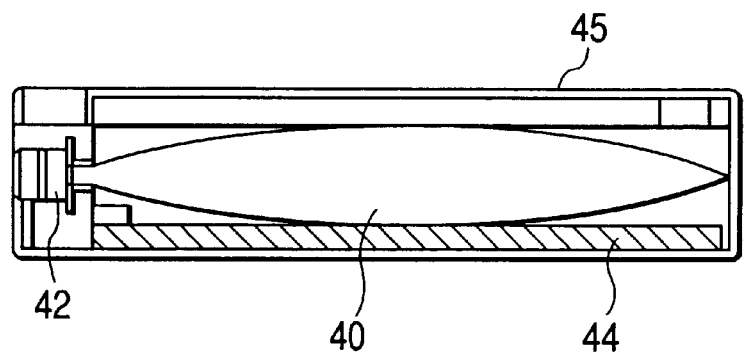
FIG. 5 is a longitudinal sectional view showing one embodiment of an ink cartridge.

FIG. 5 is an illustration of one example of an ink cartridge for housing ink supplied to the head through a supply member, e.g., a tube. Here, numeral 40 denotes an ink housing section for housing supply ink, e.g., an ink sack, at the front tip a rubber stop 42 is provided. Inserting a needle (not shown) into this stop 42 enables ink in the ink sack 40 to be supplied to the head. Numeral 44 denotes an absorber for housing the waste ink. A preferred housing section for the present invention is one whose ink contact surface with ink is formed of polyolefine, in particular polyethylene. Ink jet recordering apparatus used in the present invention are not limited to those with a separate provision of the head and the ink cartridge as mentioned above, but those with an integrated provision as shown in FIG. 6 are appropriately used.

(Recording Unit)

Figure 6:
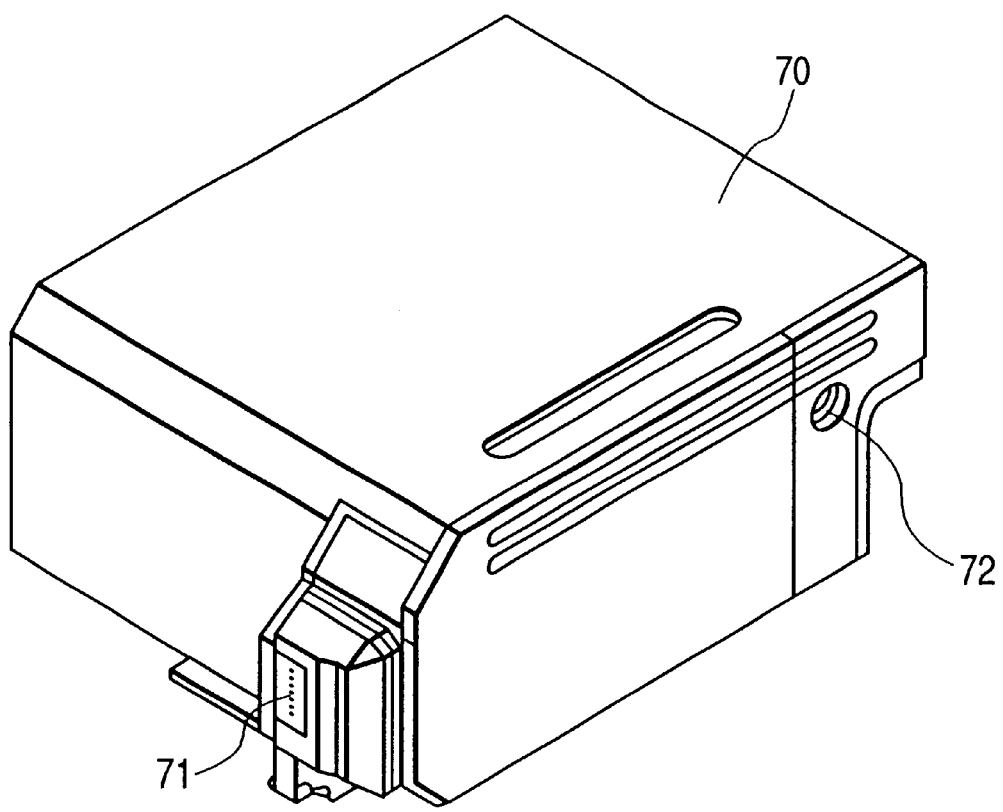
FIG. 6 is a schematic perspective view showing another constructive example of an ink jet recording head.

In FIG. 6, recording unit 70 is so arranged as to incorporate an ink housing section, e.g., an ink absorber for housing ink and to allow the ink in such an ink absorber to eject as droplets from a head section 71 having a plurality of orifices. As a material for ink absorber, use of polyurethane is preferable for the present invention. Numeral 72 denotes an atmosphere communicative hole for communicating the interior of the recording unit interior with the atmosphere. This recording unit 70 is employed in place of the recording head shown in FIG. 4 and is so arranged as detachable to the carriage 66.

(Ink Set)

Figure 7:
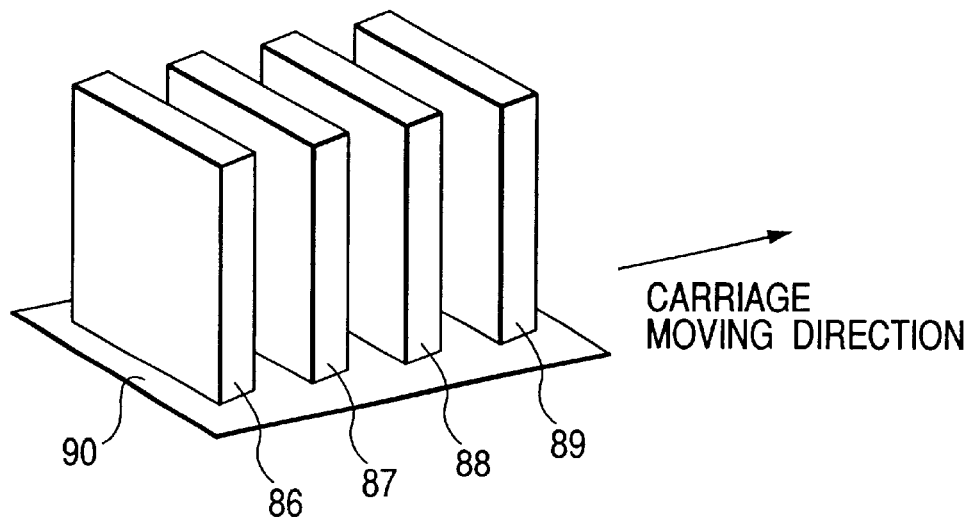
FIG. 7 is a schematic illustration of a recording head with four ink cartridges attached.
Figure 8:
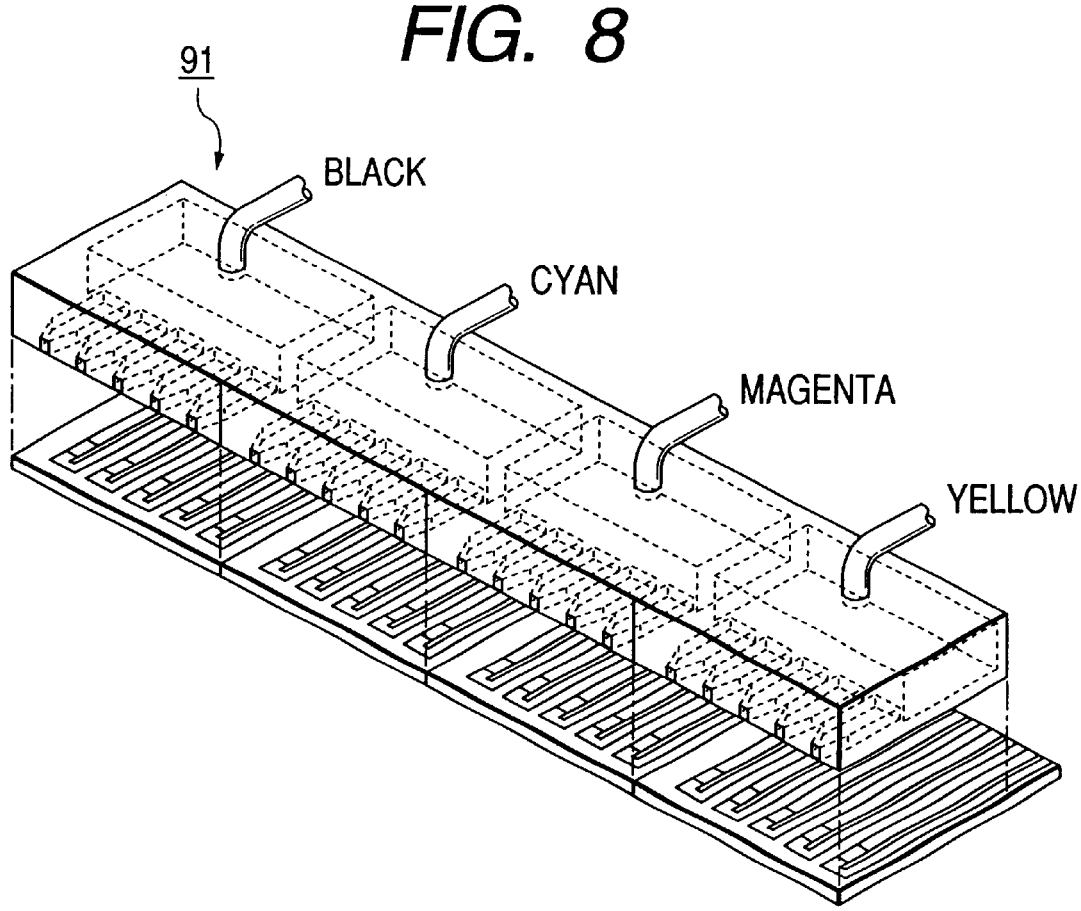
FIG. 8 is a schematic illustration showing an arrangement of four recording heads lined on a carriage.

Meanwhile, an ink according to various embodiments as mentioned above can be set to yellow, magenta, cyan, red, green, blue or black ink depending to the selection of a coloring material. And, individual types of ink may be used singly for image recording. Or, by a combination of different two or more colors of ink, it is possible to provide an ink set appropriately used for the formation of a color image. Or, by a combination of different two or more types of ink identical in color containing different coloring materials or by a combination of different two or more types of ink identical in color and different in concentration, it is possible to provide an ink set appropriately used for the formation of a high gradation color image. Or, when forming an image by employing these ink sets, a recording apparatus with four recording heads lined up on a carriage, e.g., as shown in FIG. 3, can be used. FIG. 8 shows an example of these, in which recording heads 86, 87, 88 and 89 are provided respectively for ejecting yellow, magenta, cyan and black ink, for example. The recording heads are disposed in the above recording apparatus and eject individual colors of ink in response to recording signals. Besides, FIG. 8 shows an example of using four recording heads, but the present invention is not limited to this and an embodiment of using ink cartridges for the above described four colors to divide the ink flow path and making a color image recording, for example, as shown in FIG. 7 is also referred to.

Incidentally, a device for giving thermal energy corresponding to a recording signal and ejecting an ink by means of thermal energy and a image recording method using the same have been described heretobefore. However, the ink according to the present invention can be used also for an ink jet recording apparatus of the way to eject an ink with the aid of mechanical energy and an image recording method using the same, thereby enabling a similar excellent effect to be obtained.

EXAMPLES 1 TO 14

An ink of the compositions shown in Table 1 was individually prepared. Namely, after mixing the respective materials and stirring a mixture for 2 hours, the mixture was adjusted to a desired pH by using 4N lithium hydroxide (LiOH) and then filtered through a membrane filter of 0.2 $\mu$m hole diameter under pressure to obtain individual examples of ink. Incidentally, FB 2 and DY86 in Table 1 represent the abbreviations of C.I. Food Black 2 and C.I. Direct Yellow 86, respectively.

Besides, Compound 1 is a color matter of the structure with "L", "X", "$R^1$" and "$R^2$" and "Z" designated respectively with the above formula (15), the above formula (16), a hydrogen atom and —$NH_2$.

TABLE 1

| Composition | Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| FB 2 | 3.5 | 3.5 | 3.5 | 0 | 0 | 0 | 0 | 0 | 0 | 3.5 | 0 | 4.5 | 0 | 0 |
| DY86 | 0 | 0 | 0 | 3.5 | 3.5 | 3.5 | 0 | 0 | 0 | 0 | 3.5 | 0 | 4.5 | 0 |
| Compound 1 | 0 | 0 | 0 | 0 | 0 | 0 | 3 | 3 | 3 | 0 | 0 | 0 | 0 | 4.5 |
| Glycerin | 5 | 5 | 5 | 5 | 5 | 5 | 5 | 5 | 5 | 5 | 5 | 5 | 5 | 5 |
| Urea | 0 | 0 | 0 | 0 | 0 | 5 | 5 | 5 | 5 | 5 | 5 | 0 | 0 | 0 |
| Isopropyl alcohol | 5 | 5 | 5 | 5 | 5 | 5 | 5 | 5 | 5 | 5 | 5 | 5 | 5 | 5 |
| Bis-hydroxyethyl sulfone | 6 | 20 | 20 | 6 | 10 | 10 | 6 | 10 | 10 | 20 | 10 | 10 | 10 | 10 |
| Citric acid | 0.05 | 0.05 | 0.1 | 0.05 | 0.05 | 0.1 | 0.001 | 0.001 | 0.1 | 0.05 | 0.05 | 0 | 0 | 0 |
| Succinic acid | 0 | 0 | 0 | 0 | 0 | 0 | 0 | 0 | 0 | 0 | 0 | 0.5 | 0.5 | 0.3 |
| Pure water | rest | rest | rest | rest | rest | rest | rest | rest | rest | rest | rest | rest | rest | rest |
| pH | 10.5 | 10 | 9.5 | 10.5 | 10 | 9.5 | 10.5 | 10 | 9.5 | 10 | 10 | 10 | 10 | 10 |

Reference Examples 1 to 3

An ink of the compositions shown in Table 2 was prepared in the same manner as the Examples 1 to 14.

TABLE 2

| Reference Composition | 1 | 2 | 3 |
|---|---|---|---|
| FB 2 | 3.5 | 0 | 0 |
| DY86 | 0 | 3.5 | 0 |
| Compound 1 | 0 | 0 | 3 |
| glycerin | 5 | 5 | 5 |
| isopropyl alcohol | 5 | 5 | 5 |
| bis-hydroxyethyl sulfone | 0 | 0 | 0 |
| citric acid | 0 | 0 | 0 |
| pure water | rest | rest | rest |
| pH | 10 | 9.5 | 10 |

The ink according to Examples 1 to 14 and Reference Examples 1 to 3 was ejected $6 \times 10^8$ times by using an ink jet recording head arranged so that the amount of ink ejected from one nozzle in a one ejection operation was 20 pl. Then following evaluation was made. The result is shown in Table 3.

(1) Droplet size (changes in the amount of the ejected ink by one ejection operation)

The amount of the ejected ink per nozzle after $6 \times 10^8$ time ejection was measured and compared with the initial amount of the ejected as to the respective nozzles.

A: the amount of the ejected ink after $6 \times 10^8$ time ejection 95% or more of the initial amount;

B: the amount of the ejected ink after $6 \times 10^8$ time ejection was not smaller than 80%, and smaller than 95% of the initial amount;

C: the amount of the ejected ink after $6 \times 10^8$ time ejection was smaller than 80% of the initial amount.

(2) Observation of the heater surface (Kogation) The head after the $6 \times 10^8$ time ejection was decomposed and its heater surface was observed under a optical microscope.

A: hardly any kogation was observabed.

B: some kogation was observabed, but on a level of not affecting the ejection.

C: kogation was observabed.

(3) Quality of the image (gunfire accuracy)

After the $6 \times 10^8$ time ejection, a straight line at resolution of 600 dpi was recorded on a sheet of coat paper (trade name: HR101; Canon Inc. made), the positional relation (gunfire positions) of individual dots was taken into a video image and the deviation amount ($\pm \mu$m) from 600 dpi lattice points was measured.

A: gunfire accuracy is not lower than $\pm 10$ $\mu$m;

B: gunfire accuracy is lower than $\pm 10$ $\mu$m and lower than $\pm 15$ $\mu$m;

C: gunfire accuracy is not lower than $\pm 15$ $\mu$m.

BHES+Chelating Agents

TABLE 3

|  | Change in Jet Amount | Kogation on Heater Surface | Gunfire Accuracy |
| --- | --- | --- | --- |
| Example 1 | A | A | A |
| Example 2 | A | A | A |
| Example 3 | A | A | A |
| Example 4 | A | A | A |
| Example 5 | A | A | A |
| Example 6 | A | A | A |
| Example 7 | A | A | A |
| Example 8 | A | A | A |
| Example 9 | A | A | A |
| Example 10 | A | A | A |
| Example 11 | A | A | A |
| Example 12 | A | B | A |
| Example 13 | A | B | A |
| Example 14 | A | B | A |
| Reference Example 1 | C | C | C |
| Reference Example 2 | B | C | B |
| Reference Example 3 | B | C | B |

From the result of Table 3, it was found that the occurrence of a kogation onto the surface of an exothermic heater was effectively inhibited even after the execution of recording under severe conditions such as, e.g., after $6 \times 10^8$ time ejection, by using an ink jet recording head so arranged as to minimize the jet amount of ink from one nozzle by a one-time jet operation.

Besides, a comparison of Examples 1 to 3 and 12 with Reference Example 1 and a comparison of Examples 4 to 5 and 13 with Reference Example 2 revealed that three points of a change in jet amount, the property of kogations and the gunfire accuracy could be further improved by a joint use of bis-hydroxyethyl sulfone and at least one substance selected from dicarboxylic acids, dicarboxylates, tricarboxylic acids and tricarboxylates. Especially, by a joint use of bis-hydroxyethyl sulfone and citric acid, a further inhibition of the occurrence od a scorch onto the heater surface could be implemented.

EXAMPLES 15 TO 20

Inks identical in composition to Examples 6 to 11 were prepared to make inks of Examples 15 to 20. Using an ink jet printer (trade name: BJ 130; Canon Inc. made) of the way to eject an ink by giving thermal energy to the ink with the aid of an exothermic heater, recording was carried out on a sheet of commercially available copy paper at a driving frequency of 2 kHz to estimate the re-jetting property of ink observed when a re-jet operation was made after a pause of recording. Incidentally, a printer head was employed here which was so arranged as to set the amount of ink jetted from one nozzle by a one-time jet operation to about 60 pl. Besides, with respect to estimate conditions, faulty places of printed letters, such as blurs or defects, were observed under the environments with a room temperature of 0° C. and a humidity of 25±5% for the above individual colors of ink by using the above printer when alphameric characters were printed again after a 1-min. continuous printing of alphameric characters and a 30-sec. pause. At this time, the head temperature was 35±5° C. The result is shown in Table 4. Incidentally, the criteria are as follows:

A: neither blur nor defect is noticed from the first character at the time of re-recording;

B: either a blur or a defect is noticed in part of the first character at the time of re-recording; and C: The first character cannot be printed at all at the time of re-recording.

TABLE 4

|  | Re-ejectability |
| --- | --- |
| Example 15 | A |
| Example 16 | A |
| Example 17 | A |
| Example 18 | A |
| Example 19 | A |
| Example 20 | A |

EXAMPLES 21 TO 24

An ink of the compositions shown in Table 5 was prepared in the same manner as in Examples 1 to 14.

TABLE 5

| Example Composition | 21 | 22 | 23 | 24 |
| --- | --- | --- | --- | --- |
| CI Acid Black 52:1 | 5 | 5 | 0 | 0 |
| CI Acid Blue 193 | 0 | 0 | 7 | 7 |
| bis-hydroxyethyl sulfone | 10 | 7 | 5 | 5 |
| Chelating agent | citric acid 0.1 | citric acid 0.2 | phthalic acid 0.5 | phthalic acid 0.3 |
| Diethylene glycol | 10 | 5 | 0 | 0 |
| Thiodiglycol | 0 | 5 | 10 | 0 |
| Sulforane | 0 | 0 | 0 | 0 |

TABLE 5-continued

| Example Composition | 21 | 22 | 23 | 24 |
|---|---|---|---|---|
| Triethylene glycol monobutylether | 0 | 0 | 0 | 6 |
| Water | rest | rest | rest | rest |
| pH | 5.2 | 6.5 | 4.5 | 3.7 |

References 4 to 7

An ink of the compositions shown in Table 6 was prepared in the smae manner as in Examples 1 to 14.

TABLE 6

| Example Composition | 4 | 5 | 6 |
|---|---|---|---|
| CI Acid Black 52:1 | 5 | 5 | 0 |
| CI Acid Blue 193 | 0 | 0 | 7 |
| bis-hydroxyethyl sulfone | 0 | 10 | 0 |
| Chelating agent | citric acid 0.2 | 0 | citric acid 0.2 |
| Diethylene glycol | 10 | 0 | 10 |
| Thiodiglycol | 0 | 0 | 0 |
| Sulforane | 10 | 0 | 0 |
| Triethylene glycol monobutylether | 0 | 0 | 0 |
| Water | rest | rest | rest |
| pH | 4.2 | 7.2 | 4.3 |

As to respective inks in Examples 21 to 24 and Reference Examples 4 to 6, kogation, ink-jet stability and presence of wire breaking in a heater were evaluated by using a head for bubble jet card printer (trade name: P-400CII; Canon Inc. made) according to the following criteria. The employed recording head ejected about 50 pl of ink per nozzle by one ejection operation. The result is shown in Table 7.

(1) Kogation

After a continuous character printing of $2 \times 10^8$ pulses by using 10 nozzles, the head was decomposed and the heater surface was observed with an optical microscope, when scorches on the heater surface were estimated in accordance with the criteria mentioned below:

A: no scorch whatever was observed on the heater surface;

B: some kogation was observed at the edge portions of the heater; and

C: kogation was observed all over the heater surface.

(2) Ink-Jet Stability

A continuous printing of $2 \times 10^8$ pulses was performed by means of ten nozzles, and then the decreases of the volume of ejected liquid and ejected speed, etc. were measured and evaluated in accordance with the following criteria:

A: the decrease of the volume of the ejected ink did not occur at all.

B: the volume of the ejected ink after the continuous printing was lowered by 10%, but less than 50%.

C: the volume of the ejected ink after the continuous printing was lowered by 50% or more, or the jet became impossible.

(3) Wire Breaking in Heater

After a continuous character printing of $5 \times 10^7$ pulses by using 16 nozzles, the degree of wire breaking in the heater was estimated in accordance with the criteria mentioned below:

A: no breaking of wire was observed; and

B: breaking of wire was observed in one or more nozzles.

TABLE 7

| | Kogation | Ejection Stability | Wire Breaking in Heater |
|---|---|---|---|
| Example 21 | A | A | A |
| Example 22 | A | A | A |
| Example 23 | A | A | A |
| Example 24 | A | A | A |
| Reference Example 4 | C | C | A |
| Reference Example 5 | B | B | A |
| Reference Example 6 | C | B-A | A |

As described above, according to the embodiments of the present invention, the kogation onto an exothermic heater can be effectively prevented and the ink-jet stability can be promoted even for a long time of recording. Besides, promotion of ink-jet stability enables the recording of high quality images to be stably carried out.

Besides, the occurrence of a scorch onto an exothermic heater can be effectively prevented, the ink-jet stability can be promoted and moreover the re-ejectability of ink after a pause of recording can be also improved.

Furthermore, high quality images can be stably recorded for a multifarious to-be-recorded medium and high grade images can be stably recorded under multifarious using environments. Besides, even when an attempt of a higher image quality is made by making orifices finer to obtain a further higher quality of recorded images, the kogation onto an exothermic heater can be effectively prevented and further the re-ejectability property of ink after a pause of recording can be also improved, thus enabling highly refined images to be stably recorded.

What is claimed is:

1. An ink cartridge comprising an ink housing section housing ink comprising at least one substance selected from the group consisting of dicarboxylic acids, dicarboxylates, tricarboxylic acids; and tricarboxylates; bis-hydroxyethyl sulfone and coloring material wherein the total amount of dicarboxylic acids, dicarboxylates, tricarboxylic acids and tricarboxylates is not greater than 0.7% by weight relative to the whole weight of ink.

2. A recording unit comprising an ink housing section housing ink comprising at least one substance selected from the group consisting of dicarboxylic acids, dicarboxylates, tricarboxylic acids and tricarboxylates, bis-hydroxyethyl sulfone and a coloring material wherein the total amount of dicarboxylic acids, dicarboxylates, tricarboxylic acids and tricarboxylates is not greater than 0.7% by weight relative to the whole weight of ink;

means for giving said recording ink to a recording medium; and means for supplying said ink to said means.

3. An ink set comprising a combination of ink containing at least one substance selected from dicarboxylic acids, dicarboxylates, tricarboxylic acids and tricarboxylates, bis-hydroxyethyl sulfone, and a first water-soluble coloring material in an aqueous medium wherein the total amount of dicarboxylic acids, dicarboxylates, tricarboxylic acids and tricarboxylates is not greater than 0.7% by weight relative to the whole weight of ink; and ink containing a second coloring material, wherein each of the first and the second coloring materials is selected from the group consisting of coloring materials for yellow, magenta, cyan, black, red, blue and green.

4. An image recording method having a process for giving ink to an image forming region of a to-be-recorded medium comprising at least one substance selected from the group consisting of dicarboxylic acids, dicarboxylates, tricarboxylic acids and tricarboxylates, bis-hydroxyethyl sulfone and coloring material wherein the total amount of dicarboxylic acids, dicarboxylates, tricarboxylic acids and tricarboxylates is not greater than 0.7% by weight relative to the whole weight of ink.

5. An image recording apparatus comprising a recording unit incorporating an ink housing section housing ink comprising at least one substance selected from the group of dicarboxylic acids, dicarboxylates, tricarboxylic acids and tricarboxylates, bis-hydroxyethyl sulfone and a water-soluble coloring material in an aqueous medium wherein the total amount of dicarboxylic acids, dicarboxylates, tricarboxylic acids and tricarboxylates is not greater than 0.7% by weight relative to the whole weight of ink, means for giving said ink to a to-be-recorded medium and means for supplying said ink to said means; and means for actuating the recording unit in response to a recording signal.

6. An image recording apparatus comprising a recording unit incorporating an ink housing section housing ink comprising at least one substance selected from the group consisting of dicarboxylic acids, dicarboxylates, tricarboxylic acids and tricarboxylates, bis-hydroxyethyl sulfone and a coloring material wherein the total amount of dicarboxylic acids, dicarboxylates, tricarboxylic acids and tricarboxylates is not greater than 0.7% by weight relative to the whole weight of ink, means for giving said ink to a to-be-recorded medium and means for supplying said ink to said means; and means for actuating the recording unit in response to a recording signal.

7. An image recording method having a process for giving ink comprising at least one substance selected from the group consisting of dicarboxylic acids, dicarboxylates, tricarboxylic acids and tricarboxylates, bis-hydroxyethyl sulfone, urea and a water-soluble coloring material. in an aqueous medium wherein the total amount of dicarboxylic acids, dicarboxylates, tricarboxylic acids and tricarboxylates is not greater than 0.7% by weight relative to the whole weight of ink, to an image recording region of a recording medium by using a recording head capable of ejecting 0.1 to 40 picoliters of ink from orifices with one ejection operation.

8. An image recording apparatus comprising a recording unit incorporating an ink housing section housing ink comprising at least one substance selected from the group consisting of dicarboxylic acids, dicarboxylates, tricarboxylic acids and tricarboxylates, bis-hydroxyethyl sulfone, urea and a water-soluble coloring material in an aqueous medium wherein the total amount of dicarboxylic acids, dicarboxylates, tricarboxylic acids and tricarboxylates is not greater than 0.7% by weight relative to the whole weight of ink;

a recording head having means for ejecting the ink from orifices to a recording medium and means for supplying said ink to said recording head wherein said recording head is capable of ejecting 0.1 to 40 picoliters of ink from orifices with one ejection operation; and means for actuating said recording unit in response to a recording signal.

9. A recording unit comprising an ink housing section for housing ink comprising at least one substance selected from the group consisting of dicarboxylic acids, dicarboxylates, tricarboxylic acids and tricarboxylates, bis hydroxyethyl sulfone, urea and a water-soluble coloring material in an aqueous medium wherein the total amount of dicarboxylic acids, dicarboxylates, tricarboxylic acids and tricarboxylates is not greater than 0.7% by weight relative to the whole weight of ink;

a recording head having means for ejecting the ink from orifices to a recording medium; and means for supplying said ink to said recording head wherein said recording head is capable of ejecting 0.1 to 40 picoliters of ink from orifices with one ejection operation.

10. An ink comprising:

(i) bis-hydroxyethyl suflone;

(ii) a coloring material;

(iii) an aqueous medium; and (iv) at least one substance selected from the group consisting of dicarboxylic acids, dicarboxylates, tricarboxylic acids and tricarboxylates; other than the coloring material, wherein the total amount of (iv) in the ink is not greater than 0.7% by weight relative to the whole weight of the ink.

11. The ink according to claim 10, wherein the dicarboxylic acids include succinic acid, maleic acid and phthalic acid.

12. The ink according to claim 10, wherein the tricarboxylic acids include citric acid.

13. The ink according to claim 10, wherein the dicarboxylates include metal salts of the dicarboxylic acids, and the tricarboxylates include metal salts of the tricarboxylic acids.

14. The ink according to claim 13, wherein the metal salts include sodium salts.

15. The ink according to claim 10, wherein the aqueous medium contains water.

16. The ink according to claim 10, wherein the aqueous medium contains water and a water-soluble organic solvent.

17. The ink according to claim 10, further containing urea.

18. The ink according to claim 10, wherein the coloring material is a dye having one or more COOM (M is alkali metal or ammonium) in the molecule.

19. The ink according to claim 18, wherein pH of the ink is 9.5 to 12.

20. The ink according to claim 10, wherein the coloring material is a water-soluble metal-containing dye.

21. The ink according to claim 20, wherein pH of the ink is 3.5 to 7.5.

22. The ink according to claim 21, wherein pH of the ink is 3.5 to 6.5.

23. The ink according to claim 10, being for an ink-jet recording.

24. The ink according to claim 23, wherein the ink-jet recording comprises a step of applying thermal energy.

25. An ink cartridge comprising an ink housing section housing an ink, wherein the ink comprises:

(i) bis-hydroxyethyl sulfone;

(ii) a coloring material;

(iii) an aqueous medium; and (iv) at least one substance selected from the group consisting of dicarboxylic acids, dicarboxylates, tricarboxylic acids and tricarboxylates; other than the coloring material, and wherein the total amount of (iv) is not greater than 0.7% by weight relative to the whole weight of the ink.

26. A recording unit comprising:

an ink housing section housing an ink;

means for ejection an ink; and means for supplying the ink to the means for ejecting an ink, wherein the ink comprises:
   (i) bis-hydroxyethylsulfone;
   (ii) a coloring material;
   (iii) an aqueous medium; and
   (iv) at least one substance selected from the group consisting of dicarboxylic acids, dicarboxylates, tricarboxylic acids and tricarboxylates; other than the coloring material, and
   wherein the total amount of (iv) is not greater than 0.7% by weight relative to the whole weight of the ink.

27. The recording unit according to claim 26, wherein the means for ejecting the ink is an ink-jet head capable of ejecting 0.1 to 40 picoliters of the ink from orifices thereof with one ejection operation.

28. An ink-set comprising:
   a first ink comprising;
   (i) bis-hydroxyethylsulfone;
   (ii) a first coloring material;
   (iii) an aqueous medium; and
   (iv) at least one substance selected from the group consisting of dicarboxylic acids, dicarboxylates, tricarboxylic acids and tricarboxylates; other than the coloring material, and
   a second ink comprising a second coloring material and an aqueous medium, wherein the total amount of (iv) in the first ink is not greater than 0.7% by weight relative to the whole weight of the ink, and each of the first and the second coloring materials is selected from the group consisting of coloring materials for yellow, magenta, cyan, black, red, blue and green.

29. An image recording method comprising a step of ejecting an ink to a recording medium with an ink-jet head, wherein the ink comprises:
   (i) bis-hydroxyethylsulfone;
   (ii) a coloring material;
   (iii) an aqueous medium; and
   (iv) at least one substance selected from the group consisting of dicarboxylic acids, dicarboxylates, tricarboxylic acids and tricarboxylates; other than the coloring material, and
   wherein the total amount of (iv) in the ink is not greater than 0.7% by weight relative to the whole weight of the ink.

30. The image recording method according to claim 29, wherein the in k-jet head is capable of ejecting 0.1 to 40 picoliters of ink from an orifice with one ejection operation.

31. The image recording method according to claim 29, wherein the ink is ejected by applying thermal energy with the ink-jet head.

32. An image recording apparatus comprising:
   a recording unit having;
   an ink housing section housing an ink;
   means for ejecting the ink; and
   means for supplying the ink to the means for ejecting the ink, and means for actuating the recording unit in response to a recording signal, wherein the ink comprises;
   (i) bis-hydroxyethyl sulfone;
   (ii) a water-soluble coloring material;
   (iii) an aqueous medium; and
   (iv) at least one substance selected from the group consisting of dicarboxylic acids, dicarboxylates, tricarboxylic acids and tricarboxylates; other than the coloring material, and
   wherein the total amount of (iv) in the ink is not greater than 0.7% by weight relative to the whole weight of the ink.

33. An image recording apparatus comprising:
   a recording unit having;
   an ink housing section housing an ink;
   means for ejecting the ink; and
   means for supplying the ink to the means for ejecting the ink, and means for actuating the recording unit in response to a recording signal, wherein the ink comprises;
   (i) bis-hydroxyethyl sulfone;
   (ii) a coloring material;
   (iii) an aqueous medium; and
   (iv) at least one substance selected from the group consisting of dicarboxylic acids, dicarboxylates, tricarboxylic acids and tricarboxylates; other than the coloring material, and
   wherein the total amount of (iv) in the ink is not greater than 0.7% by weight relative to the whole weight of the ink.

34. The image recoding apparatus according to claim 31 or claim 32, wherein the means for ejecting an ink is an ink-jet head provided with orifices from which the ink is ejected, and wherein the ink-jet head is capable of ejection 0.1 to 40 picoliters of an ink from the orifices with one ejection operation.

35. An ink-jet ink comprising:
   (i) bis-hydroxyethyl sulfone;
   (ii) a water-soluble dye;
   (iii) an aqueous medium; and
   (iv) at least one substance selected from the group consisting of dicarboxylic acids, dicarboxylates, tricarboxylic acids and tricarboxylates; other than the water-soluble dye.

36. The ink according to claim 35, wherein the dicarboxylic acids include succinic acid, maleic acid and phthalic acid.

37. The ink according to claim 35, wherein the tricarboxylic acids include citric acid.

38. The ink according to claim 35, wherein the dicarboxylates and tricarboxylates include metal salts of the dicarboxylic acids and tricarboxylic acids.

39. The ink according to claim 38, wherein the metal salts include sodium salts.

40. The ink according to claim 35, wherein the content of (i) ranges from 0.1 to 30% by weight relative to the whole weight of the ink.

41. An ink cartridge comprising an ink housing section housing an ink, wherein the ink comprises;
   (i) bis-hydroxyethylsulfone;
   (ii) a water soluble dye;
   (iii) an aqueous medium; and
   (iv) at least one substance selected from the group consisting of dicarboxylic acids, dicarboxylates, tricarboxylic acids and tricarboxylates; other than the water-soluble dye.

42. A recording unit comprising:
   an ink housing section housing an ink;

means for ejecting the ink; and means for supplying the ink to the means for ejecting the ink, and means for actuating the recording unit in response to a recoding signal, wherein the ink comprises;
(i) bis-hydroxyethylsulfone;
(ii) a water-soluble dye;
(iii) an aqueous medium; and
(iv) at least one substance selected from the group consisting of dicarboxylic acids, dicarboxylates, tricarboxylic acids and tricarboxylates; other than the water-soluble dye.

43. An ink set comprising:

a first ink comprising;
(i) bis-hydroxyethyl sulfone;
(ii) a water-soluble dye;
(iii) an aqueous medium; and
(iv) at least one substance selected from the group consisting of dicarboxylic acids, dicarboxylates, tricarboxylic acids and tricarboxylates; other than the water-soluble dye, and a second ink comprising a coloring material and an aqueous medium, wherein the water-soluble dye in the first ink is selected from the group consisting of water-soluble dyes for yellow, magenta, cyan, black, red, blue and green, and the coloring material in the second ink is selected from the group consisting of coloring materials for yellow, magenta, cyan, black, red, blue and green.

44. An image recording method comprising a step of ejecting an ink with an ink-jet head, wherein the ink comprises
(i) bis-hydroxyethyl sulfone;
(ii) a water-soluble dye;
(iii) an aqueous medium; and
(iv) at least one substance selected from the group consisting of dicarboxylic acids, dicarboxylates, tricarboxylic acids and tricarboxylates; other than the water-soluble dye.

45. An image recording apparatus comprising a recording unit having an ink housing section housing an ink;

means for ejecting the ink; and means for supplying the ink to the means for ejecting the ink, and means for actuating the recording unit in response to a recording signal, wherein the ink comprises
(i) bis-hydroxyethyl sulfone;
(ii) a water-soluble dye;
(iii) an aqueous medium; and
(iv) at least one substance selected from the group consisting of dicarboxylic acids, dicarboxylates, tricarboxylic acids and tricarboxylates; other than the water-soluble dye.

* * * * *

UNITED STATES PATENT AND TRADEMARK OFFICE
CERTIFICATE OF CORRECTION

PATENT NO. : 6,398,355 B1
DATED : June 4, 2002
INVENTOR(S) : Koromo Shirota et al.

It is certified that error appears in the above-identified patent and that said Letters Patent is hereby corrected as shown below:

Column 1,
Line 29, "of:" should read -- of --.
Line 45, "litter" should read -- little --.
Line 46, "matters" should read -- matter --; and "so called" should read -- so-called --.
Line 49, "matters" should read -- matter --; and "are" should be deleted.
Line 52, "form" should read -- from --.

Column 2,
Line 21, "ccurring" should read -- occurring --.
Line 22, "in" should be deleted.
Line 31, "break through" should read -- a breakthrough --.
Line 61, "further" should read -- a further --.

Column 4,
Line 6, "as;" should read -- as: --.
Line 67, "stick-to" should read -- stick to --.

Column 6,
Line 47, ":dicarboxylic" should read -- dicarboxylic --.

Column 11,
Line 61, "to:within" should read -- to within --.
Line 66, "BHES:" should read -- BHES --.
Line 67, "a" should read -- an --.

Column 12,
Line 15, ":result" should read -- result --.
Line 38, "available." should read -- available --.
Line 55, "OH" (first occurrence) should be deleted.

Column 14,
Line 6, close up right margin.
Line 7, close up left margin.

UNITED STATES PATENT AND TRADEMARK OFFICE
CERTIFICATE OF CORRECTION

PATENT NO. : 6,398,355 B1
DATED : June 4, 2002
INVENTOR(S) : Koromo Shirota et al.

It is certified that error appears in the above-identified patent and that said Letters Patent is hereby corrected as shown below:

Column 15,
Line 21, "part" should read -- parts --.
Line 35, "to" should be deleted.
Line 37, "electrode" should read -- electrodes --.
Line 45, "a" should read -- an --.

Column 16,
Line 16, "canti lever." should read -- cantilever. --.
Line 55, "project." should read -- project --.

Column 17,
Line 27, "as" should read -- as to be --.

Column 18,
Line 8, "a" should read -- an --.

Column 19,
Line 14, "amount;" should read -- amount; and --.
Line 17, "(Kogation) The" should read -- (Kogation) ¶The --.
Line 19, "a" should read -- an --.
Line 20, "observabed." should read -- observed. --.
Line 21, "observabed," should read -- observed, --.
Line 23, "observabed." should read -- observed. --.

Column 20,
Line 8, "od" should read -- of --.
Line 37, "The" should read -- the --.

Column 23,
Line 45, "material." should read -- material --.

Column 24,
Line 7, "bis hydroxyethyl" should read -- bis-hydroxyethyl --.
Line 14, "and means" should read -- and ¶means --.
Line 19, "suflone" should read -- sulfone --.

UNITED STATES PATENT AND TRADEMARK OFFICE
CERTIFICATE OF CORRECTION

PATENT NO. : 6,398,355 B1
DATED : June 4, 2002
INVENTOR(S) : Koromo Shirota et al.

It is certified that error appears in the above-identified patent and that said Letters Patent is hereby corrected as shown below:

Column 25,
Line 7, "ejection" should read -- ejecting --.
Line 10, "bis-hydroxyethylsulfone;" should read -- bis-hydroxyethyl sulfone; --.
Line 26, "bis-hydroxyethylsulfone;" should read -- bis-hydroxyethyl sulfone; --.
Line 43, "bis-hydroxyethylsulfone;" should read -- bis-hydroxyethyl sulfone; --.
Line 54, "in k-jet" should read -- ink-jet --.
Line 60, "having;" should read -- having: --.
Line 66, "comprises;" should read -- comprises: --.

Column 26,
Line 12, "having;" should read -- having: --.
Line 18, "comprises;" should read -- comprises: --.
Line 32, "ejection" should read -- ejecting --.
Line 57, "comprises;" should read -- comprises: --.
Line 58, "bis-hydroxyethylsulfone;" should read -- bis-hydroxyethyl sulfone; --.

Column 27,
Line 4, "recoding" should read -- recording --.
Line 5, "prises;" should read -- prises: --.
Line 6, "bis-hydroxyethylsulfone;" should read -- bis-hydroxyethyl sulfone; --.
Line 14, "comprising;" should read -- comprising: --.

Signed and Sealed this

Thirty-first Day of December, 2002